United States Patent [19]

Lopman

[11] 3,981,213

[45] Sept. 21, 1976

[54] ROTARY SHEET MATERIAL CUTTER AND CREASER

[76] Inventor: Albert Lopman, 123 Dayton Road, Lake Worth, Fla. 33463

[22] Filed: Oct. 25, 1974

[21] Appl. No.: 518,078

[52] U.S. Cl. .................... 83/346; 83/669; 93/58.2 F

[51] Int. Cl.$^2$ .................... B23D 25/12; B26D 1/56

[58] Field of Search .......... 83/346, 347, 663, 665, 83/669, 670, 673, 674, 675; 93/58.1, 58.2 R, 58.2 F, 58.4; 76/107 C

[56] References Cited

UNITED STATES PATENTS

| | | | |
|---|---|---|---|
| 1,577,620 | 3/1926 | Gammeter | 83/346 X |
| 3,190,194 | 6/1965 | Kirby et al. | 93/58.2 F |
| 3,789,715 | 2/1974 | Schuchardt | 83/669 |

*Primary Examiner*—Donald R. Schran
*Attorney, Agent, or Firm*—Gustave Miller

[57] ABSTRACT

This is a rotary sheet material cutter and creaser, particularly intended for cutting and creasing cartons out of rolls of sheet cardboard. It includes a rotary cutting and creasing die geared together with a rotary anvil and particularly provided as an attachment for or end part of a carton-printing printing press, which printing press is conventional, and which may be multi-color.

The cutter and creaser of this device is synchronized with the printing press by having its gearing geared to the printing press gearing in a conventional manner, and may be provided in gangs for operation on a wide roll of material, thus providing a multiplicity of cut-out cartons simultaneously. The sheet material is fed through the conventional printing press in a conventional manner from a roll, then through this device to cut out and crease the folds of the carton blank.

As thus completed, the blanks are deposited in a collecting station, and the waste from which the blanks are cut is then collected in a waste roll for disposal.

11 Claims, 10 Drawing Figures

ROTARY SHEET MATERIAL CUTTER AND CREASER

BACKGROUND OF THIS INVENTION

This device includes a rotary cutter and creaser die on a sleeve cooperating with a rotary anvil sleeve of more ductil material than the cutting and creasing rules secured on the die sleeve. Both sleeves are mounted on cylinders geared together for operation from any suitable source, such as being geared to a printing press from which the printed sheet material is fed.

The cutting and creasing rules are individually triangular in cross-section, and have concave lateral sides between the cutting and creasing blade edge. The base or back-surface is also concave. The edges between the concave base and lateral sides are right angular, with vertical sides and horizontal bottom surfaces, the bottom surfaces being in the same plane. The desired pattern or configurations of the carton cuts and creases are delineated on the die sleeve, and fingers are struck up from the sleeve in such pattern or configuration, in pairs of opposed fingers to thus hold and secure the rules for the die surface.

Obviously, the device may be used with any suitable type of sheet material, such as heavy paper, corrugated paper, appropriately thin sheet metal or the like. The cutting rules have sharp edges, the creasing rules have blunt edges, and a perforation line-making rule has alternate portions of sharp edges and blunt edges. The rules are of a triangular cross section that they may be bent or curved to provide any desired pattern or configuration and be secured to a die sleeve for operation in this device.

Cartons are generally cut from flat sheets of cardboard which may have been previously printed if desired. As such, the individual flat sheets must be handled individually, necessitating much additional labor, even when the sheets are cut by a rotary cutter passing over the table anvil. With this invention, all this labor is eliminated, the anvil as well as the die are rotary and cylindrical, and the invention is geared to and thus synchronized with the carton printing press, so that the roll of material passes through the printing press and then through this device, whereupon the cutout printed cartons are deposited at a collecting station and the waste sheet material is collected in a roll for disposal.

OBJECTS OF THIS INVENTION

It is an object of this invention to provide a rotary cutting and creasing device for cutting out and creasing sheet material of appropriate material, such as paper, cardboard, corrugated paper, thin sheet metal or even suitable cloth or plastic sheet material.

A further object of this invention is to provide a novel combination of a die sleeve whereon cutting and creasing rules may be secured mechanically by fingers struck up from the die sleeve in desired pattern to mechanically secure the rules, triangular in cross-section, thereto, thus eliminating conventional soldering or cementing of the rule to the cylinder.

A further object of this invention is to provide cutting and creasing rules, substantially triangular in cross-section, that have substantially concave lateral sides and a base back-surface, with right angular edges between the base and sides for cooperating with fingers struck up from the die sleeve to mechanically secure the rules to the die sleeve.

A further object of this invention is to provide an improved rule and die that is an improvement over that shown in prior U.S. Pat. Nos. of Harshberger, 1,584,095; Martin, 3,380,328; Robinson, 3,645,155; and Schuchardt et al, 3,789,715.

BRIEF DESCRIPTION OF THE FIGURES

With the above and related objects in view, this invention consists in the details of construction and combination of parts, as will be more fully understood from the following description, when read in conjunction with the accompanying drawings, in which.

DETAILED DESCRIPTION OF THE INVENTION

Figure 1:
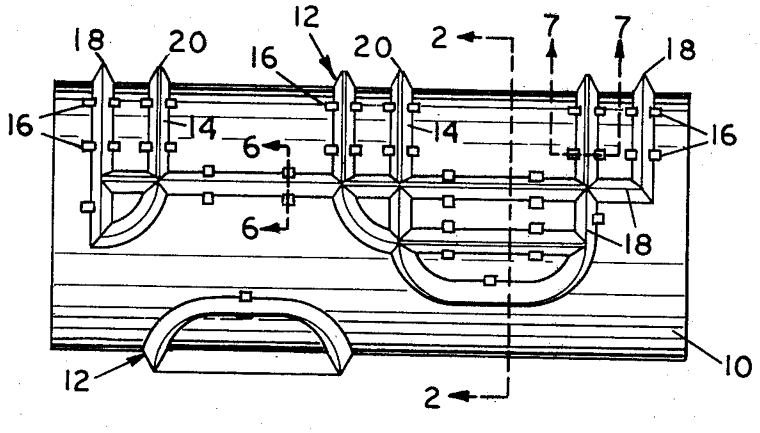
FIG. 1 is a plan view of the rotary die sleeve of this invention.
Figure 2:
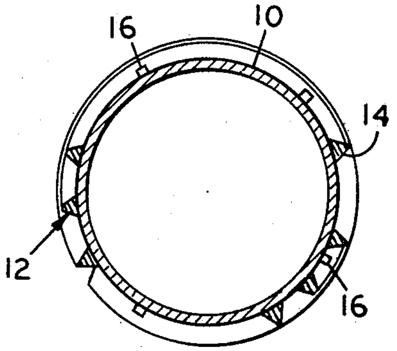
FIG. 2 is a section on line 2—2 of FIG. 1.

There is shown at 10 the rotary die sleeve of this invention on which the strip-like cutting blade 18 or creasing blade 20 of rule means 12 is secured by having its lateral concave sides 14 partly embraced from opposite sides by pairs of fingers 16 struck up from the die sleeve 10. The fingers 10 are delineated in a desired pattern on the surface of the die sleeve 10 to do a cutting job by cutting edge 18 of a rule 12, or a creasing job by the blunt edge 20 of a rule, or a cutting and creasing job by the perforation line forming rule 12 having alternating cutting edges 22 and blunt edges 24.

Figure 7:
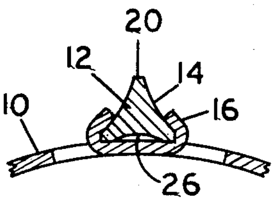
FIG. 7 is a sectional, fragmentary view, on line 7—7 of FIG. 1, showing the creasing rule as secured on the die sleeve.
Figure 6:
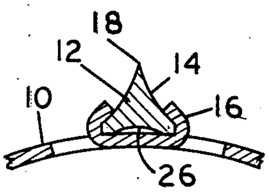
FIG. 6 is a sectional, fragmentary view, on line 6—6 of FIG. 1, showing the cutting rule as secured on the die sleeve.
Figure 5:
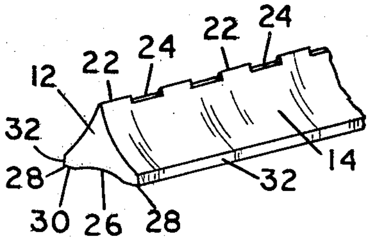
FIG. 5 is a perspective view of a perforation line forming rule.
Figure 8:
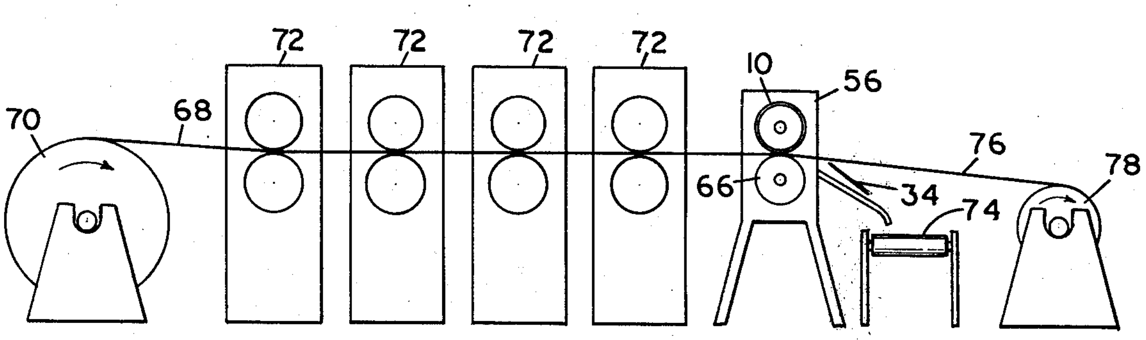
FIG. 8 is a schematic of rotary die and anvil operating mechanism assembled with a rotary carton printer, including a product collector and a waste roll collector.

As shown in FIGS. 5, 6 and 7, the base back-surface 26 of the rule 12 is slightly more concave than the convex surface of the die sleeve 10, and the concave lateral sides 14 are joined to the concave back-surface 26 by right angular edges 28 having a flat horizontal bottom 30 and vertical sides 32, thus providing a more secure holding surface for the struck-up fingers 16.

Figure 3:
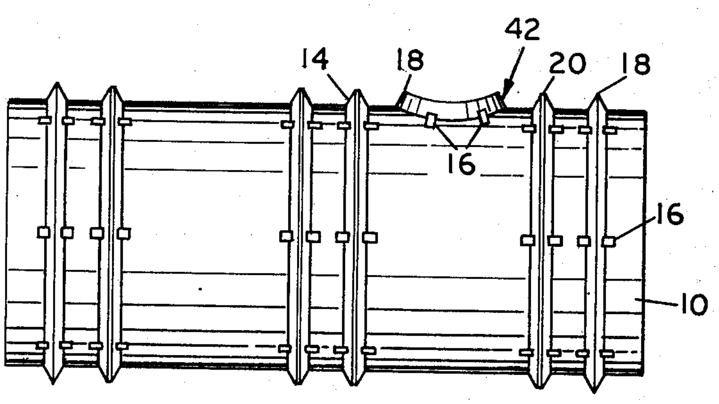
FIG. 3 is a plan view of the die sleeve, rotated to show the circle cutter in side elevation.
Figure 4:
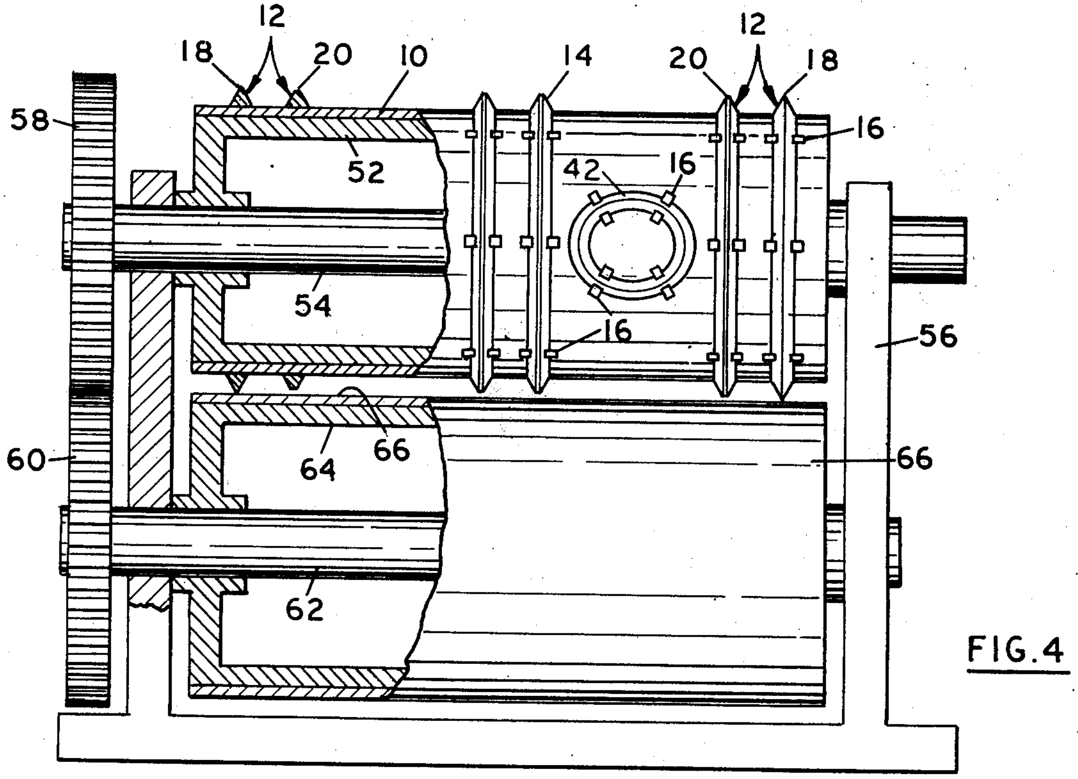
FIG. 4 shows the assembled die and anvil sleeve and rotation mechanism, partly broken away, the die sleeve showing the circle cutter in plan elevation.
Figure 9:
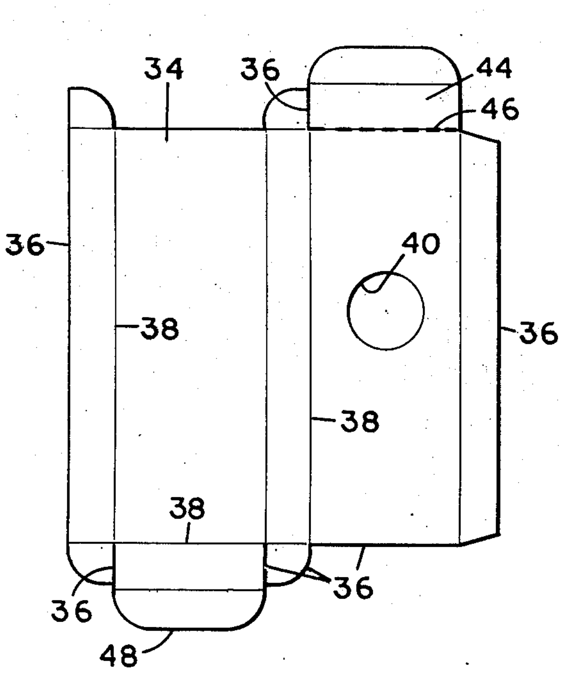
FIG. 9 shows a carton blank cut out and creased by die sleeve and rules of this invention.
Figure 10:
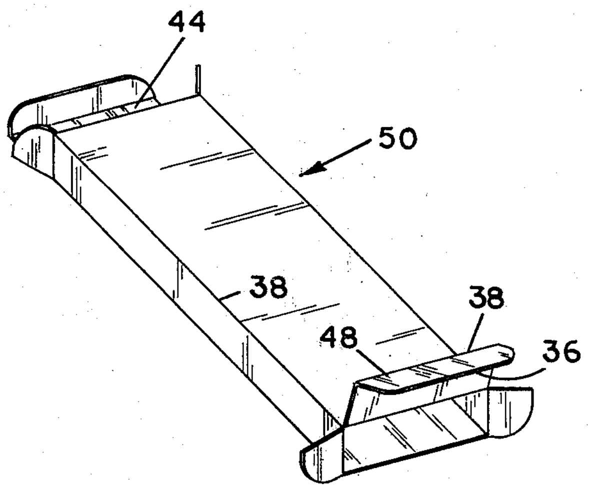
FIG. 10 shows a completed carton.

The carton blank 34 shown in FIG. 9 also reveals the pattern of the rules delineated on the die sleeve 10. All the cut edges 36 are provided by appropriately located rules 10 having cutting edges 18. The creases 38 are similarly provided by rules with blunt edges 20. A circular window 40 is provided by appropriately located and shaped rule 42 having a cutting edge. While the window cutting rule is circular, due to the fact that rule 40 is bent in order to be attached on a cylindrical surface, it thus appears to be oval to the eye, as apparent from FIG. 3 and FIG. 4.

If desired, the carton blank 34 may have a coupon 44 printed on one flap and, in such case, the cutting and creasing edge 22–24 of FIG. 5 is appropriately delineated to provide a perforating crease line 46 thereon. The other flap 48 is provided by crease line 38 to fold up into the assembled carton 50.

The rotary cutting and creasing die 10 is mounted on a die cylinder 52 fixed on a shaft 54 journaled in a framework 56. A gear 58 fixed on die shaft 54 is meshed with a gear 60 on the shaft 62 of an anvil cylinder 64 carrying an anvil sleeve 66 of ductile metal against which the harder rules 12 may cut or crease the sheet material 68 as it comes from a roll 70. This sheet material 68 may be first fed through a conventional rotary printing press schematically shown at 72 and then fed between rotary die 10 and anvil 66 of this invention. Press 72 may be conventionally multicolor. The gears 58 and 60 are controlled by the operating mechanism or gears of the press 72 in a conventional manner to keep the carton cutting and creasing of this invention synchronized with the printing press 72. The carton blanks 34 cut from the sheet material 68 drop out on a collecting station 74 which may be a table or endless belt delivering them to a suitable area, and the waste 76 from the sheet material is collected in a roll 78, for suitable disposal.

OPERATION OF THE INVENTION

In operation, the desired pattern of the carton blank 34 is first delineated in any desired manner on the surface of the rotary die 10, then the securing fingers 16 are struck up and embraced over the desired cutting and creasing rules 12 with their appropriate cutting edges 18 to cut out the edges 36 of the carton blank, their blunt or creasing edges 20 provide the necessary folding creases 38 for the folds, and, where desired, the cutting and creasing rule of FIG. 5 for providing a perforation or tear line 46. The die sleeve 10 is then assembled on its die cylinder 52, while the anvil sleeve 66 is assembled on its anvil cylinder 14 and then both cylinders 52 and 64 are assembled on their shafts 54 and 62, then assembled with their gears 58 and 60 in the framework 56. Any number of assembled sets may be assembled in gangs for simultaneous multiple operation, either with or without coordination with a printing press, depending on whether a printed carton or unprinted carton is desired.

Although this invention has been described in considerable detail, such description is intended as being illustrative rather than limiting, since the invention may be variously embodied.

Having thus set forth and disclosed the nature of this invention, what is claimed is:

1. A rotary cutting and creasing apparatus for the continuous cutting and creasing of forms (34) from rolls (70) of sheet material (68) of paper, cardboard, corrugated paper or like rolls comprising a die sleeve (10), a die sleeve supporting base cylinder (52), an anvil sleeve (66), an anvil sleeve supporting base cylinder (64), each base cylinder (52, 64) having a bearing shaft (54, 62) extending axially therethrough and through a bearing framework (56), means (58, 60) gearing said shafts (54, 62) together for simultaneous rotation, said anvil sleeve (66) being of ductile material, said die sleeve (10) being of comparatively harder material, said die sleeve (10) having cutting and creasing rule means (12) delineated thereon in desired patterns, said rule means (12) being substantially triangular in cross-section, and spaced opposed fingers (16) struck up from said die sleeve embracing opposite lateral sides (14) of said rule means (12) securing said rule means (12) to said die sleeve (10).

2. The apparatus of claim 1, said lateral sides (14) of said rule means (12) being somewhat concave to receive said opposed struck-up fingers (16) thereagainst.

3. The apparatus of claim 2, the base back-surface (26) of said rule means (12) being also somewhat concave.

4. The apparatus of claim 3, the meeting edges (28) of said concave lateral sides (14) and said base back-surface (26) being right angular, the base sides (30) of said right angular meeting edges (28) being in the same horizontal plane.

5. A rotary cutting and creasing apparatus for the cutting and creasing of forms from sheet material (68) comprising an elongated rule means (12) of substantially triangular cross-section, said rule means (12) having a cutting edge (18) and creasing (20) edge means extending in the longitudinal direction of said rule, a somewhat concave back-surface (26) extending opposite to said cutting and creasing edge means (18, 20) and lateral surfaces (14) extending between said cutting and creasing edge means (18, 20) and both outer edges (28) of said base back-surface (26), said base back-surface having outer edges (28) extending parallel with respect to said cutting and creasing edge means (18, 20) and defining the width of said base back-surface (26), a die sleeve (10), a cutting and creasing pattern delineated on said die sleeve (10) by a plurality of oppositely and longitudinally spaced apart fingers (16) struck up from said die sleeve (10), said struck-up fingers (16) securing said rule means (12) to said die sleeve (10) by pressing against said opposite lateral sides (14) with said base back-surface (26) in contact with the die sleeve surface, said rule means (12) being thereby secured between the oppositely spaced struck-up fingers (16).

6. The combination of claim 5, said fingers (16) being arranged in pairs of opposed fingers.

7. The combination of claim 5, said rule means lateral surfaces (14) being concave to receive said struck-up fingers (16) thereagainst.

8. The combination of claim 5, said edge means including a cutting edge (18, 22).

9. The combination of claim 7, said edge means including a creasing edge (20, 24).

10. The combination of claim 5, said cutting (22) and creasing edge means (24) including a perforation line-making edge.

11. The combination of claim 5, said sheet material (68) being fed from a roll (70) thereof, a rotatable anvil sleeve member (66) of ductile material, a die cylinder (52) and an anvil cylinder (64) on which said sleeve members (10, 66) are mounted for cooperation with each other, and gear means (38, 60) for rotating said sleeve members (10, 66) and feeding said sheet material (62) therebetween for operation thereon.

* * * * *